Inventors
THEODORE W. KELLER
CHARLES W. GARVIN

Cushman, Darby & Cushman
Attorneys

Sept. 22, 1953

T. W. KELLER ET AL

2,652,879

BAGMAKING MACHINE

Original Filed March 23, 1949

Inventors.
THEODORE W. KELLER
CHARLES W. GARVIN

Cushman, Darby & Cushman
Attorneys

Sept. 22, 1953    T. W. KELLER ET AL    2,652,879
BAGMAKING MACHINE
Original Filed March 23, 1949    8 Sheets-Sheet 4

Inventors.
THEODORE W. KELLER
CHARLES W. GARVIN

Cushman, Darby & Cushman
Attorneys

Sept. 22, 1953     T. W. KELLER ET AL     2,652,879
BAGMAKING MACHINE
Original Filed March 23, 1949     8 Sheets-Sheet 5

Inventors.
THEODORE W. KELLER
CHARLES W. GARVIN

Cushman, Darby & Cushman
Attorneys.

Sept. 22, 1953

T. W. KELLER ET AL 2,652,879

BAGMAKING MACHINE

Original Filed March 23, 1949

INVENTORS
THEODORE W. KELLER
CHARLES W. GARVIN
BY
Cushman, Darby & Cushman
Attorneys Sept. 22, 1953  T. W. KELLER ET AL  2,652,879
BAGMAKING MACHINE
Original Filed March 23, 1949  8 Sheets-Sheet 8

Inventors.
THEODORE W. KELLER
CHARLES W. GARVIN

Cushman, Darby & Cushman
Attorneys

Patented Sept. 22, 1953

2,652,879

UNITED STATES PATENT OFFICE 2,652,879

BAGMAKING MACHINE

Theodore W. Keller, Council Bluffs, Iowa, and Charles W. Garvin, Omaha, Nebr.

Original application March 23, 1949, Serial No. 82,934. Divided and this application June 19, 1951, Serial No. 240,768

23 Claims. (Cl. 154—42)

This invention relates to a machine for heat sealing multi-layer thermoplastic stock, and more particularly to a machine for fabricating bags from tubular extruded thermoplastic stock.

Numerous recently developed thermoplastic materials are recognized to be excellent packaging materials, especially for food, but are not readily adaptable to fabrication into bags and the like by known machines. Heat sealing, for example, is commonly employed to process thermoplastic stock into seamless bags. Some materials, however, notably polyethylene and polyvinylidene chloride, are difficult to handle and fabricate satisfactorily by conventional heat sealing machines, because of pronounced tendencies to stick to heated machine elements, to deform when heated, and especially because of their sharply defined melting points. The latter property necessitates rigid control of the temperature and pressure employed in the heat sealing operation, to attain an effective seal without severing or otherwise damaging the material. In addition, polyethylene is a dielectric, so that electrical heating methods therefor are not feasible. The properties of these materials have heretofore limited their use to tedious and expensive manually controlled heat sealing operations.

Polyethylene and polyvinylidene chloride are commonly extruded in tubular form, and supplied as rolls of flattened tubular stock, wound on hollow cores. The flattened tubing is produced in various widths, ranging from one inch to several feet, and wall thicknesses, ranging from .001 to .030 inch or more, and is furnished either with or without side tucks. The rolls vary in length from 100 yards to about 800 yards, depending on width and thickness. It is particularly to the automatic and continuous fabrication of the above-described tubular stock material into bags that the present invention is directed.

The present machine is based on the concept of using preformed tubular stock of appropriate width and wall thickness for the type of bag desired, intermittently feeding said stock from a suitable supply in measured and regulated bag lengths, tensioning the stock, transversely heat sealing the stock into integral bag lengths, and finally cutting off finished bags by severing the stock adjacent the heat seals.

It is an object of the present invention to provide a novel and efficient apparatus for heat sealing multi-layer thermoplastic stock material.

It is a further object of the present invention to provide a machine for continuously and automatically fabricating tubular thermoplastic stock into seamless bags.

A further object of the invention is to provide a bag making machine employing as starting material tubular thermoplastic stock of various widths and thicknesses, and adjustable to produce therefrom bags of widely variable length.

A particular object of the invention is to provide apparatus adapted to uniformly and effectively heat seal multi-layer thermoplastic stock of uneven thickness along the sealing line, or of different numbers of layers along said line.

A further object is the provision of means to prevent sticking of polyethylene-type material to heated sealing elements in heat sealing operations.

Other objects of the invention will be in part obvious and in part pointed out hereinafter.

The invention and the novel features may best be made clear from the following description and the accompanying drawings, in which.

Figure 1:
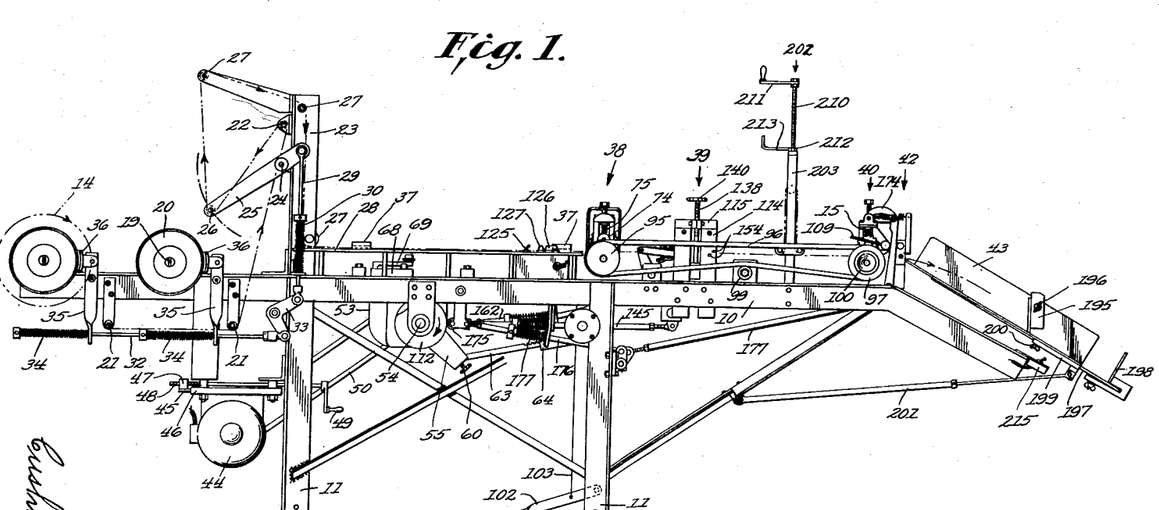
Figure 1 is a side elevation of a preferred embodiment of the present invention.
Figure 2:
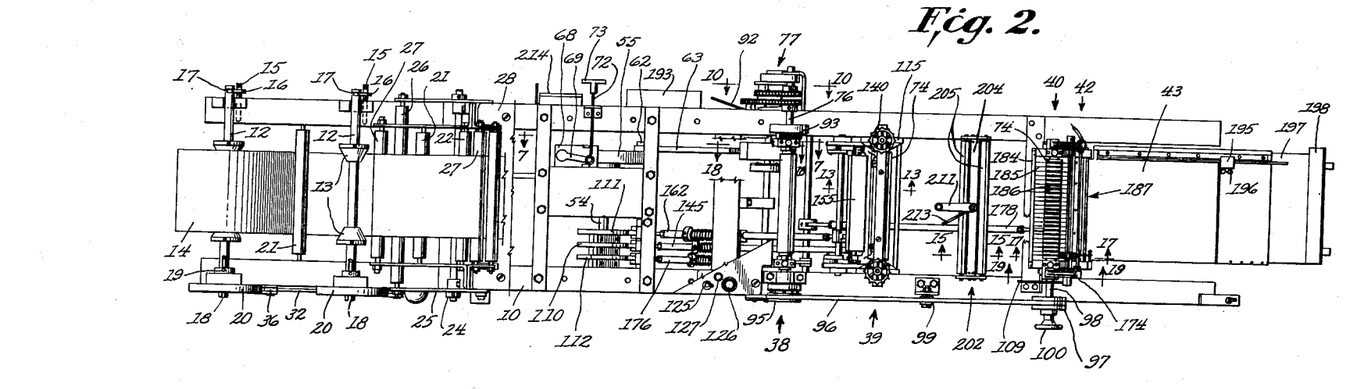
Figure 2 is a plan view of the machine of Figure 1, with parts broken away for clarity.

Referring to the drawings, particularly Figures 1 and 2, the preferred embodiment comprises a frame 10, suitably mounted as on legs 11, which may be castered if desired, to permit shifting of the machine from place to place. At one end of the frame a plurality of spindles 12 are removably mounted in suitable bearings, each of the spindles carrying a pair of adjustable positioning cones 13, adapted to position and align the hollow cores upon which rolls of the tubular stock 14 are customarily wound. For final alignment of the stock, the spindles are desirably adjustable transversely of the frame, as by the screws 15 engaging the spindle bearings and carrying the disc members 16, by which the spindle end grooves 17 are engaged. The opposite ends of the spindles are slotted as at 18, whereby they slidably engage the pins 19 of the brake discs 20, whereby the brake discs are rotatable with the spindles to control the stock feed therefrom in a manner presently to be described.

Stock rolls may be mounted on each of the spindles 12 and fed into the machine one at a time, each roll as it approaches exhaustion being sealed or otherwise suitably connected to a new roll on the other spindle, permitting the machine to operate substantially without interruption for stock replenishment, and avoiding the necessity of rethreading the machine with each roll of stock. Operated in this fashion, the machine processes a single stock strip, and produces bags singly. To produce a plurality of bags simultaneously, as may be desirable in operating with narrow stock, stock rolls may be laterally offset relative to each other on the spindles, and the stock strips passed through the machine side by side. The several feeding, sealing and cutting mechanisms function in the same manner whether operating upon a single strip or upon a plurality of strips.

The spindles revolve in the direction shown by the arrow in Figure 1, and the tubular stock is drawn off along the path indicated by the dotted line, passing under the guide rods 21 and then over the guide roll 22, supported by the uprights 23 extending from the machine frame. Adjacent guide roll 22 the uprights support the pivot bearings 24, upon which the arms 25 are pivotally mounted, supporting at one end thereof the swinging guide roll 26. From guide roll 22, the stock passes around the guide roll 26, and thence over the fixed guide rolls of rods 27 to a position immediately above the table section 28.

Coupled to the opposite end of one of the arms 25 is the push rod 29, engaged and urged upwardly by the enclosing spring 30. The thrust rod 32 is operatively engaged by push rod 29 through the bellcrank 33, pivotally mounted on the frame of the machine. By means of springs 34 and levers 35, thrust rod 32 urges the brake blocks 36 into frictional engagement with brake discs 19 with variable pressure. As the stock is intermittently drawn from the feeding mechanism over the guide rods 27, the guide roll 26 is caused to swing upwardly, pivoting the arms 25 in the clockwise direction as shown in Figure 1, thereby effecting through push rod 29 and thrust rod 32 a lessening of the pressure of brake blocks 36 on the brake discs 19, and permitting the spindles 12 to rotate more easily to let off stock. In this manner, the swinging guide roll 26 and the associated mechanism act not only to automatically control the stock feed and maintain proper tension, but also, primarily by means of the weight and swinging action of the arms 25 and roll 26, to smooth out the inertia effect of the feeding operation.

Figure 3:
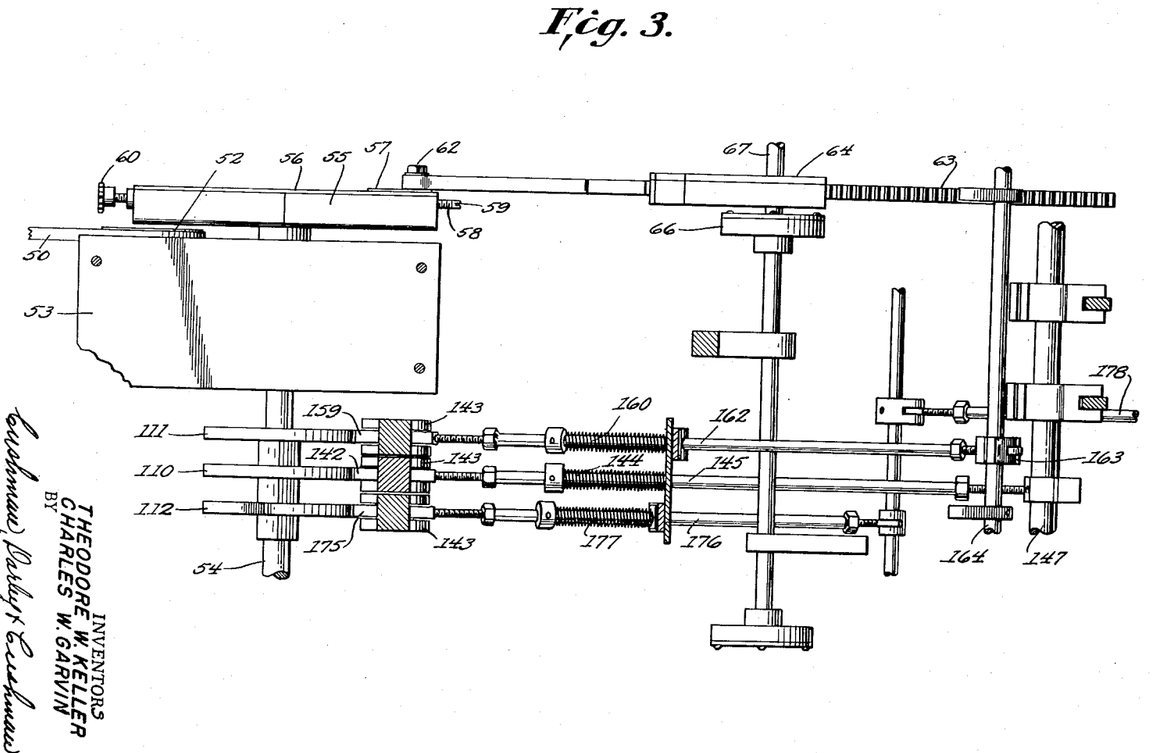
Figure 3 is an enlarged sectional plan view of the mechanism for driving and coordinating the various component mechanisms of the machine.

From the guide rods 27, the stock passes over table section 28, passing under the control bars 37, and then successively through the first feed roll stand indicated generally as 38, the heat sealer 39, the second feed roll stand 40, and the cutter 42, into receiving tray 43. The feed rolls, the heat sealer and associated wiper mechanism, and the cutter, each described hereafter in detail, are all intermittently driven in suitably coordinated manner by a single source of motive power, such as the motor 44. As shown, motor 44 depends from the plate 45, slidably retained between the guide channels 46, which are rigidly secured to the frame of the machine. The internally threaded lug 47 extends from plate 45 and is engaged by the threaded crank rod 48. Rotation of the crank rod 48 is effected by the handle 49, by means of which, it will be understood, the plate 45 and motor 44 may be displaced relative to the guide channels 46. The motor 44, by means of a conventional variable speed pulley (not shown), drives belt 50 and the pulley 52, extending from gear box 53 (see Figure 3). By this arrangement, the tension of the belt 50 may be altered by relatively displacing the motor 44, thereby changing the effective pitch diameter of the variable speed pulley driving the belt, and adjusting the rotational speed transmitted to the pulley 52. In place of this arrangement, a variable speed motor and suitable controls therefor may be employed. Within gear box 53 the pulley 52 is operatively engaged through speed reducing gears to the drive shaft 54.

Figure 7:
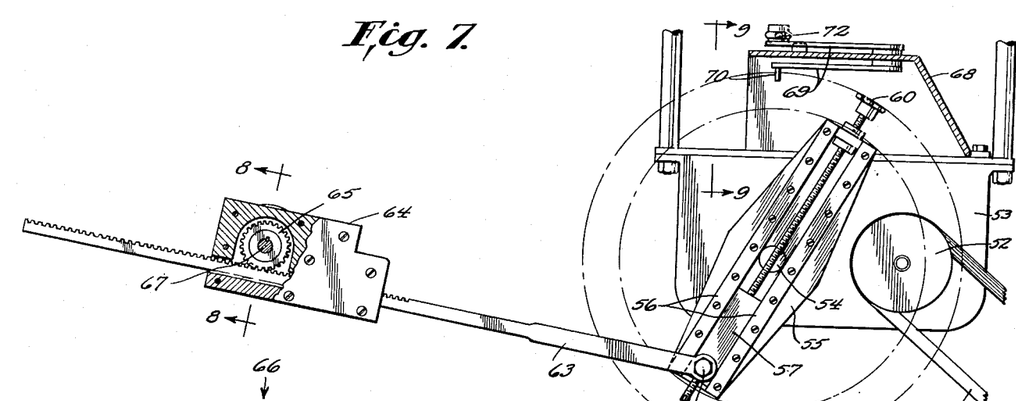
Figure 7 is a detailed view of the feed roll driving mechanism, taken on the line 7—7 of Figure 2.
Figure 8:
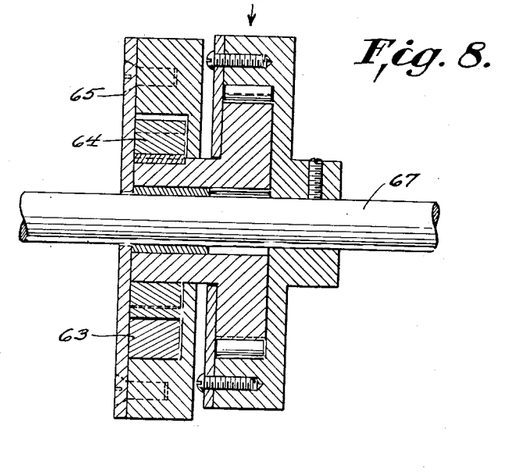
Figure 8 is an enlarged sectional view of the feed roll drive overrunning clutch, taken on the line 8—8 of Figure 7.

Drive shaft 54 is the common driving element for the stock feeding mechanism, the heat sealer, the heat sealer wiper mechanism, and the cutter, all of which operate intermittently. All of the intermittently operating component mechanisms being driven by a common shaft, proper coordination thereof is positively and simply effected. The stock feeding mechanism will first be described, and comprises the slide carrier 55, mounted at one end of drive shaft 54 and provided with suitable ways 56, adapted to support and guide the slide member 57 retained therebetween. Slide 57 is threadably engaged by the adjusting screw 58, whereby it may be controllably displaced longitudinally of the slide carrier. The screw 58 is provided at one end thereof with the slot 59, for rough adjustment of the slide, and at the opposite end thereof with the star wheel 60, for finer adjustment of the slide (see Figures 3 and 7). By means of pin 62, the slide is pivotally connected in driving relationship to the rack 63, arranged to reciprocate within the gear case 64, wherein the rack engages gear 65, keyed to the conventional one way overrunning clutch indicated generally as 66 (Figure 8). The overrunning clutch transmits rotary motion of the gear 65 in one direction only to the shaft 67, suitably journalled in the frame of the machine. It will be readily understood that by means of the slide carrier 55, slide 57, rack 63, gear 65 and the overrunning clutch 66, continuous rotation of the drive shaft 54 is converted into intermittent rotary movement of the shaft 67.

Figure 9:
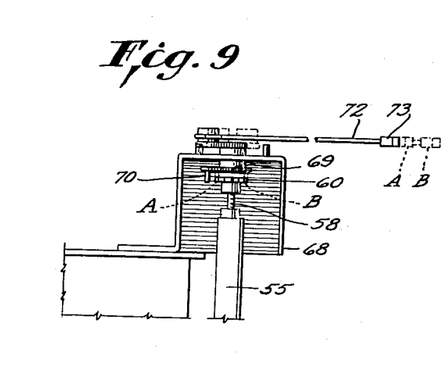
Figure 9 is a detailed view of the feed roll drive adjustment, taken substantially on the line 9—9 of Figure 7.

By adjusting the slide 57 relative to the slide carrier 55, the operative throw of rack 63 and the corresponding rotary movement of shaft 67 occasioned by each revolution of the drive shaft 54 may be varied as desired. When the machine is at rest, this may be accomplished by the rotation of screw 58 by means of a suitable tool engaged to the slot 59 thereof. Means are also provided for adjustably positioning the slide 57 when the machine is in operation. As best shown in Figures 2, 7 and 9, the path of the slide carrier is partially enclosed by the housing 68, mounted on gear box 53. Arm 69, pivotally mounted in housing 68, supports the downwardly depending adjusting pin 70, and is controlled by the rod 72 and handle 73 extending outwardly from the side of the machine frame. By moving handle 73 to place pin 70 in dotted line position A (Figure 9), it will be seen that each revolution of the slide carrier brings star wheel 60 into engagement with adjusting pin 70 and effects angular displacement of the star wheel and the associated screw 58, thereby adjusting the position of the slide 57. Such adjustment continues progressively as long as the adjusting pin remains in position A. By moving the pin 70 to the dotted line position B, adjustment in the opposite direction is effected. When no adjustment is required, the pin 70 is maintained in the neutral position shown in full lines.

Figure 10:
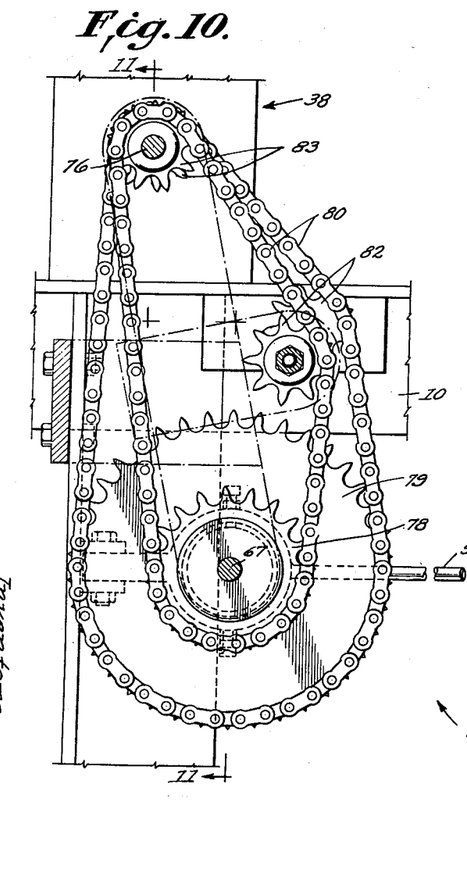
Figure 10 is an elevational view of the two-speed differential mechanism for the feed roll drive, taken on the line 10—10 of Figure 2.
Figure 11:
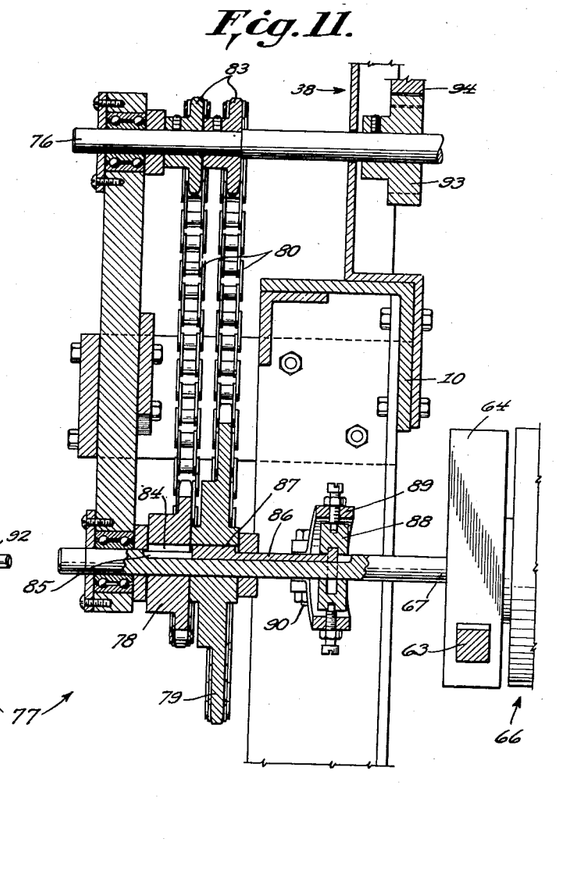
Figure 11 is a sectional view taken along the line 11—11 of Figure 10.
Figure 12:
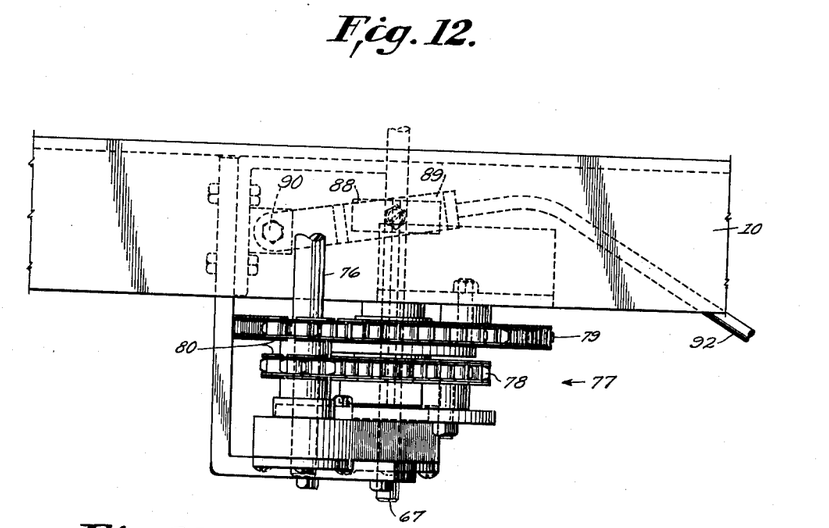
Figure 12 is a plan view of the differential drive of Figure 10, showing details of the speed changing mechanism.

Each of the feed roll stands 39 and 40 supports a pair of contra-rotating feed rolls 74, desirably surfaced with soft rubber or similar traction material, suitably journalled in said stands and urged into pressure contact by the springs 75 bearing on the ends of the upper feed rolls. The feed roll pairs are interconnected, and driven in unison in accordance with the intermittent rotation of shaft 67, whereby they engage and advance the stock in step-by-step fashion. Referring particularly to Figures 10, 11 and 12, the feed roll pairs are driven through the shaft 76, which extends outwardly from the lower feed roll of stand 39, and is operatively engaged to the shaft 67 by means of the dual ratio transmission mechanism indicated generally as 77. Transmission 77 comprises a small sprocket 78 and a larger sprocket 79 mounted side by side on shaft 67, each engaged by a chain 80. The chains 80 also engage idler sprockets 82 and identical sprockets 83, pinned to shaft 76. Each of sprockets 78 and 79 is provided with an internal keyway 84, and the shaft 67 with the elongated keyway 85, wherein the key 86 is slidably retained. Key 86 comprises the end projection 87, adapted to selectively engage one or the other of the keyways 84 of sprockets 78 and 79.

The other end of key 86 is retained by the sliding collar 88, which is operatively engaged by the yoke 89, pivotally mounted on bolt 90 and operable by means of the handle 92 extending from said yoke. It will be apparent that by means of the handle 92, acting through yoke 89 and collar 88, the key 86 may be controllably positioned, permitting selective engagement of the key projection 87 with the key-way 84 of either of the sprockets 78 and 79. The sprocket not engaged, of course, runs free. By this means the shaft 76 and the associated feed rolls may be driven by shaft 67 alternatively through sprocket 78 or through sprocket 79.

The shaft 76 turns the lower feed roll 74 of stand 39, and by means of the associated gear 93 (Figure 11) and the meshing gear 94 fixed to the upper feed roll effects contra-rotation of the roll pair. The shaft 76 also drives the feed roll pair of stand 40, by means of the pulley 95, fixed to the end of shaft 76 opposite the transmission 77, and operatively engaged by the belt 96 to the variable speed pulley 97, mounted on the shaft 98 of the lower feed roll of stand 40. The belt 96 also engages the idler pulley 99, mounted on the machine frame. The variable speed pulley 97 may be of the type variable in effective pitch diameter in accordance with the tension of the engaging belt, controlled as by the positioning of idler pulley 99, but is more conveniently of the type variable in effective pitch diameter by adjustment of a handwheel, such as handwheel 100. The upper and lower feed rolls of stand 40 are linked in contra-rotating relationship by meshing gears, similarly to the first feed roll pair.

By the mechanism above described, the feed roll pairs are operated intermittently, in unison, each cycle of operation effecting advance of the stock a distance corresponding to a single bag length. The stock advance, or bag length, may be varied over a wide range, merely by adjusting screw 58, to suitably position the slide 57. Since the lengths of screw 58 and rack 63 are necessarily limited, the range of bag lengths which the machine is capable of producing is greatly extended by the transmission 77. For example, the smaller sprocket 78 may be so sized as to permit adjustment of the machine by the slide 57 to a bag length ranging from 1 to 18 inches, and the sprocket 79 selected to correspond to a bag length of from 2 to 36 inches. Obviously, the fineness of adjustment effected by the screw 58 is correspondingly greater when the smaller sprocket 78 is engaged. By means of the transmission 77, then, the machine may be shifted from a moderate range of bag length adjustability, with very fine adjustment over that range, to a greatly extended range of adjustability, when necessitated by the requirements of the work on hand.

Due to the natural stretch of the stock and elongation thereof incident to the heat sealing operation, which is performed intermediate the feed roll stands, to maintain the desired tension between the feed roll stands it is essential that the stock advance of the second feed roll pair exceed slightly that of the first pair. Since the feed roll pairs operate in unison, or concurrently, to attain this end it is necessary that the peripheral speed of the second feed roll pair exceed that of the first. The peripheral speed differential is effected by the variable speed pulley 97, and may be adjusted thereby as required. Proper tensioning of the stock during and immediately following the heat sealing operation is an important feature of the present invention, as will presently be more fully apparent.

The facilitate initial threading of stock therethrough, means are provided to lift the upper roll of each feed roll pair, against the pressure of the springs 75. In the case of stand 39, the treadle 102 is provided, pivotally fixed to one of the legs 11. Treadle 102, acting through the rod or cable 103, is adapted to displace the lever 104

Figure 19:
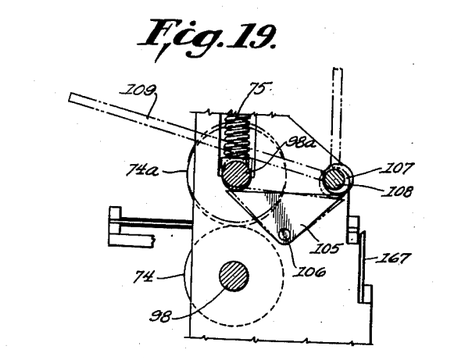
Figure 19 is an enlarged detail view of the roll separating means for the second feed roll pair, taken on the line 19—19 of Figure 2.
Figure 20:
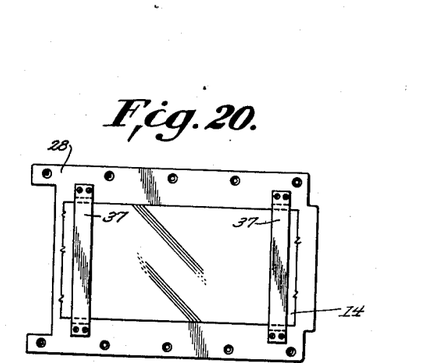
Figure 20 is a plan view of the table section broken away in Figure 2, showing the stock control bars thereon.

(see Figure 18), thereby raising the fork member 105 relative to the lower feed roll 74, and with the fork member the upper feed roll 74a. In the case of stand 40 (Figure 19), the upper feed roll shaft 98a is engaged by one end of a triangular pivot block 105, pivotally mounted on the stud 106. The opposite end of the pivot block is engaged by the eccentric cam 107, mounted on stub shaft 108. The stub shaft and associated cam may be rotated by the handle 109 extending therefrom, causing the cam to depress the adjacent end of the pivot block to the dotted line position shown, thereby raising the opposite end of the pivot block and with it the upper feed roll shaft 98a. Upon release of the handle 109, the spring 75 returns the upper feed roll to pressure engagement with the lower feed roll.

The drive shaft 54 drives not only the stock feeding mechanism, as above described, but also, by means of the cams 110, 111 and 112, the heat sealer 39, the wiper mechanism associated with the heat sealer, and the cutter 42, respectively, all in proper coordination. After passage through the first feed roll pair, the stock next passes to the heat sealer 39.

Figure 13:
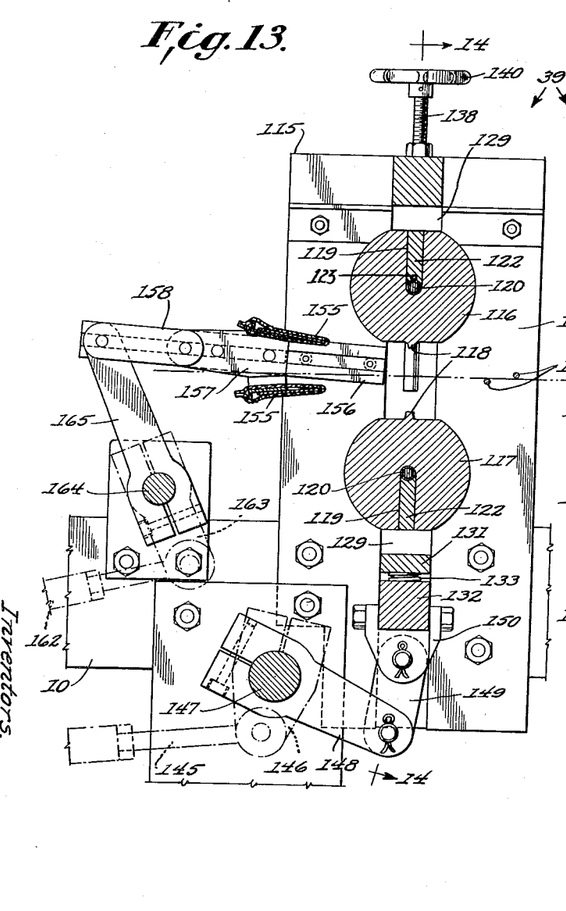
Figure 13 is an enlarged sectional elevation of the heat sealing mechanism and the associated wipers therefor, taken on the line 13—13 of Figure 2.
Figure 14:
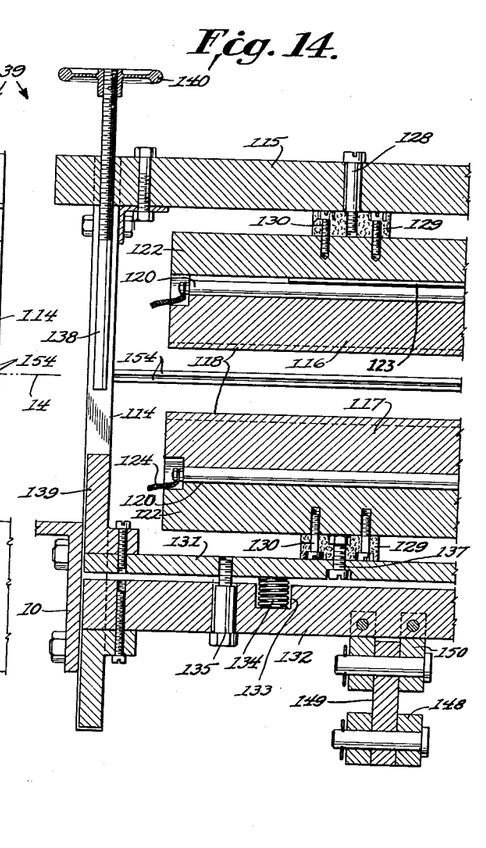
Figure 14 is a section taken along the line 14—14 of Figure 13.

The heat sealer (Figures 13 and 14) comprises spaced guideways extending upwardly from the spaced frame sides, each composed of two spaced vertical members 114, joined at their upper end by the I-shaped top member 115. The operative elements of the heat sealer are the fixed upper sealing member 116 and the reciprocable lower sealing member 117, disposed with the blade portions 118 thereof in opposed relationship. The sealing members are desirably of aluminum, annealed and stress relieved so that the machined and polished sealing faces of the blade portions remain flat and parallel at sealing temperatures. At the bottom of slots 119, the tubular resistance heating elements 120 extend the length of the sealing members, and are secured by retainer bars 122. The slot 119 of the upper sealing member includes also the bulb type thermostatic element 123.

It has been found that the temperature of the sealing faces of the blade portions 118 is maintained most nearly constant by the employment of sealing members of relatively great mass as compared to the area of the sealing faces thereof. For example, by employing sealing members of 2½ inches diameter and sealing faces one-eighth of an inch wide, it has been found that the temperature of the sealing faces is easily controlled to a range of 3° F. or less. Current to the heating elements 120 is supplied through the wires 124, and controlled by switch 125, conveniently located on the table section 28 (see Figure 2). Adjacent switch 125 is a control dial 126, whereby the operative temperature of the control element may be selected, and, if desired, a pilot light 127 to indicate when current is flowing to the heating elements. The thermostatic control element 123 may be of any conventional type operative to make and break a circuit in response to changes in temperature.

The upper sealing member 116 is rigidly mounted below top member 115, desirably by means of a plurality of bolts 128, extending through the top member and threaded into insulating blocks 129, which are in turn suitably secured to the retainer bar 122 of the member 116, as by the screws 130. It will be noted that in the case of the outer bolts 128, the passage therefor through top member 115 is oversized, to accommodate expansion and contraction of the sealing member relative to its center.

Below the upper sealing member, the guideways formed by the vertical members 114 retain and guide the reciprocating carriage 132. In the upper surface of carriage 132 are provided a plurality of recesses 133, wherein are contained the coil springs 134. The support member 131 is similarly retained and guided by said guideways, and supported above the carriage 132 by the springs 134. Bolts 135, extending through the carriage and threaded into the support member, limit the spacing between the carriage and the support member. The lower sealing member 117 is mounted above support member 131 in opposed relationship to the upper sealing member 116, by means of the bolts 137, insulating blocks 129, and screws 130, in a manner similar to the mounting of the upper sealing member.

The approach of the blade portions 118 of the lower and upper sealing members is limited by the stop rods 138, one of which is provided between each pair of vertical members 114. The stop rods are threadably engaged to the top member 115 and extend downwardly therefrom, with their ends in spaced opposition to the stops 139, fixed to the support member 131 between the vertical members 114 and extending upwardly therefrom. Each of the stop rods 138 is provided at its upper end with a handwheel 140, by means of which the operative ends of the stop rods may be adjustably positioned.

Figure 5:
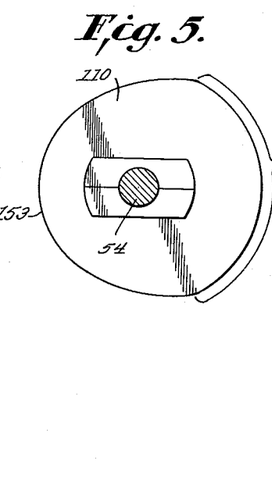

The reciprocation of carriage 132, the support member 131, and the lower sealing member 117 is effected by cam 110 mounted on the drive shaft 54. The cam 110 is engaged by cam follower 142, guided by the pivot arm 143 depending from the frame 11, and urged into contact with the cam by the spring 144 enclosing push rod 145. The push rod 145 by means of link arm 146 (Figure 13) is adapted to impart rocking motion to the rock shaft 147, which motion is transmitted by the arm 148 and the link 149 to the yoke 150, suitably bolted to and extending downwardly from the carriage 132. By this means, it will be readily seen, motion of the cam follower 142 inwardly and outwardly relative to drive shaft 54 effects reciprocation of the lower sealing member 117 toward and away from the upper sealing member 116. The details of the cam 110 are shown in Figure 5, wherein it will be seen that the cam comprises a high operative surface 152 of considerable angular extent, and a lower inoperative surface 153. With the cam follower 142 in contact with surface 153, the spring 144 effects retraction of the lower sealing member 117 to the position shown in Figure 13. As the cam 110 rotates, the cam follower is forced outwardly from the drive shaft 54, thereby displacing push rod 145 and raising the sealing member upwardly toward the upper sealing member 116. When the cam follower 142 is engaged by the cam surface 152, the lower sealing member is at the upper end of its travel, in spaced adjacency to the upper sealing member.

The heat sealer mechanism above described has been found to be particularly effective in the intermittent heat sealing of polyethylene and polyvinylidene chloride stock. Such stock is particularly liable to destruction by the application of pressure members with excessive temperature and pressure. By means of the handwheels 140, the stop rods 138 are adjusted to limit the approach of the lower blade portion to the upper blade portion, to a finite value less than the original thickness of the stock being operated upon. When the lower blade portion 118 engages the stock, it exerts only the pressure transmitted by the springs 144, and as the lower blade portion compresses the stock, the pressure exerted remains substantially constant, by virtue of the resilient mounting of the blade member. Compression of the stock between the blade members is limited by the stop rods 138, which, when engaged by the stops 139, prevent further approach of the lower blade portion to the upper blade portion, and limit the action of said blade portions for the remainder of their cycle of operation to heat transfer to the stock engaged therebetween, thereby positively preventing severing of the stock material. By the use of a plurality of transversely spaced springs 144, uniform pressure across the width of the stock strip is insured. Further, the provision of a stop rod 138 at each end of the heat sealer provides for differential adjustment of the maximum approach position of the ends of the lower sealing member, thereby providing for satisfactory heat sealing of flattened tubular stock which may be somewhat wedge shaped in cross section, without unduly compressing the thicker edge portion thereof. The combination of the resilient support for the lower sealing member and the stop rods therefor affords satisfactory heat sealing of flattened tubular material comprising side tucks, wherein such material is of four wall thicknesses adjacent the edges thereof and of but two wall thicknesses in the center, the blades compressing the tucked portions of the stock sufficiently to engage and heat seal the central portion of the stock, but being prevented from severing any portion of said stock by the stop rods 138. The spring pressure exerted by the lower sealing member on the stock may be altered, obviously, by suitably selecting or replacing the springs 144, and may more conveniently be adjusted within a small range by adjusting the length of the push rod 145.

The cam 110 is angularly positioned on the drive shaft 54 relative to the slide carrier 55 and its associated stock feeding mechanism so as to effect elevation of the lower sealing member 117 into operative position between periods of stock advance, and the operative surface 152 of the cam is sufficiently long to effect engagement of the sealing members for substantially the entire time period between cycles of stock advance. The long period of the heat sealing step is an important feature of the invention, as will more fully appear in the description of the operation of the machine.

The upper sealing member 116 is positioned somewhat above the normal path of the stock 14, so that the stock is displaced upwardly by the lower sealing member as it moves into sealing engagement with the upper member. The sealing members are desirably formed of metal, preferably aluminum, and some thermoplastic stock materials, notably polyethylene and polyvinylidene chloride, exhibit a decided tendency to stick to the blade portions thereof, especially to the stationary upper blade. At the termination of the heat sealing operation, advance of the stock by the feed rolls tends to pull the heat sealed area away from the blade portions. The separation of the stock is facilitated by the provision of the pair of vertically spaced breaker bars 154, extending across the stock path a short distance beyond the point of heat sealing, conveniently between the trailing pair of vertical members 114. The breaker bars have the effect of increasing the angularity with which the stock is stripped from the blade portions, thereby materially assisting the stripping.

It has been found that sticking of the stock, especially polyethylene, to the metal sealing members may be greatly diminished by interposition of a film of silicone resin therebetween. The resin is most conveniently applied to the blade portions of the sealing members, and the film periodically replenished. To this end, a spaced pair of intermittently operated wiper blades 155, substantially coextensive in length with the blade portions 118, are mounted between the leading pair of vertical members 114 of the heat sealer. As is apparent in Figure 13, the guides 156 are mounted inside said vertical members, and slidably retain the end plates 157. The wiper blades 155 extend between said end plates, and are covered by a layer of suitable absorbent material, such as felt. The end plates 157 and the associated wiper blades are reciprocated within the guides 156 by the link 158, the guides being positioned and adapted to effect wiping contact of the wiper blades with the blade portions of the sealing members at one end of the wiper blade traverse.

Figure 4:
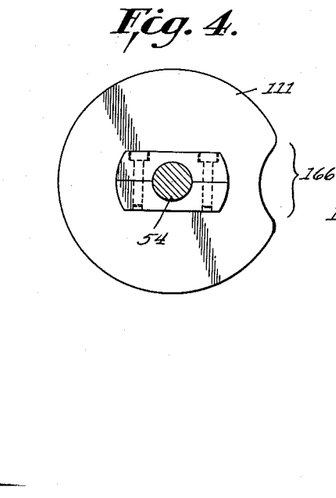
Figures 4, 5 and 6 are enlarged views of the cams governing the operation of the cutter, the heat sealer, and the sealer wipers, respectively.

The reciprocation of the sealer blades is effected and suitably coordinated by the cam 111 mounted on the drive shaft 54. The cam 111 is engaged by cam follower 159, urged into contact with the cam by the spring 160 enclosing push rod 162. The push rod 162 is operatively connected to the arm 163, by means of which the rock shaft 164 and arm 165 are reciprocated. The reciprocation of arm 165 is transmitted by link 158 to the wiper blade assembly, which is caused thereby to reciprocate between the position shown in Figure 13 and a position intermediate the sealing members, in which latter position the wipers engage the sealing member blade portions. The contour of cam 111 is shown in Figure 4, wherein it will be seen that the cam is of uniform diameter except for the depression 166. When the cam follower 159 rides upon the uniform surface of the cam, the wiper blades remain in their retracted, inoperative position. When, however, the cam follower enters the depression 166, the push rod 162 is displaced by the action of spring 160 in conformity with the movement of the cam follower toward the drive shaft 54, thereby causing displacement of the wipers into operative wiping engagement with the blade portions of the sealing members. The cam 111 is positioned on the drive shaft 54 to effect operation of the wiper blade assembly when the sealing members are in retracted, inoperative position. The absorbent covering of the wiper blades is periodically saturated with a suitable silicone resin composition, one such being that known as "D C Mold Release Emulsion #35," a water-silicone emulsion manufactured by the Dow-Corning Corporation of Midland, Michigan.

From the heat sealer 39, the stock advances to feed roll stand 40, and then to the cutter mechanism 42 associated therewith. The cutter 42 (Figure 17) comprises the stationary blade 167 and the movable blade 168 reciprocably mounted relative thereto. The blade 168 is mounted between the blade members 169 by means of pins 170. By means of the outwardly extending arm 172 and the tension spring 173, extending from the outer end of said arm to an extension of the machine frame, the cutting edge of the blade 168 is constantly urged toward the cutting edge of blade 167, the blade 168 tending to rotate about the pins 170. The cutting edge of the upper blade is desirably ground at a slight angle, to effect a shearing action between the blades. Blade members 169 are flexibly connected to the roll stand 40 by the guide arms 174, pivotally connected to the upper ends of said roll stand.

Figure 6:
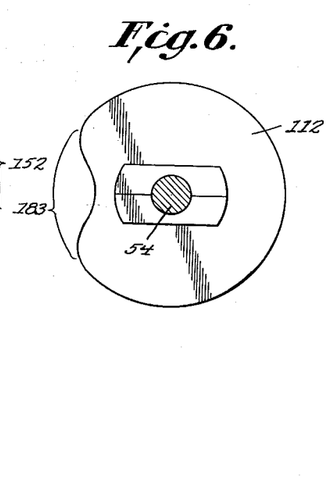

The movable upper cutting blade 168 is reciprocated and suitably coordinated by rotation of the cam 112 mounted on the drive shaft 54. The cam 112 is engaged by cam follower 175, and the push rod 176 is urged by the spring 177 toward the drive shaft in accordance with the movement of the cam follower. The movement of push rod 176 is transmitted through a suitable mechanical linkage to the rod 178 and thence through arm 179 to the rock shaft 180. The rock shaft 180 effects angular reciprocation of the arm 182 extending therefrom, by means of which the blade members 169 and the associated cutting blade 168 are reciprocated in a substantially vertical plane. The contour of the cam 112 is shown in Figure 6, wherein it will be seen that the cam is of uniform radius except for the depression 183. When the cam follower 175 rides upon the uniform outer surface of the cam 112, the cutting blades are maintained in spaced, inoperative position. When the cam follower enters the depression 183, push rod 176 and rod 178 are displaced in the direction of the drive shaft 54, thereby effecting displacement of the blade 168 downwardly into cutting engagement with the stationary blade 167. The cam 112 is positioned on the drive shaft 54 to effect a cutting operation between periods of stock advance, or in other words, while the stock is at rest. By means of the cams 110, 111 and 112, then, it will be seen, the other intermittently operated mechanisms of the machine are properly coordinated with the feed roll drive and the step-by-step advance of the stock achieved thereby. In other words, the feed roll pairs intermittently advance the stock a desired length, the length of one bag, and the heat sealer and cutter function between the periods of stock advance, when the stock is at rest. The wiper mechanism is timed to function when the heat sealer is inoperative, at which time, of course, the stock is being advanced.

A difficult problem involved in the processing of polyethylene stock is the accumulation on the surface thereof of static electrical charges. Once the stock is severed into individual bag lengths, control thereof is extremely difficult, and it is an outstanding feature of the present invention that the cutting operation is the final step. Even so, the severed end of the elongated stock strip is difficult to control when a bag length is severed therefrom, and to obviate this difficulty it has been found desirable to guide the stock through the second pair of feed rolls to the cutter in a positively controlled manner. This is attained by the provision of a pair of spaced guide grids (see Figure 17) comprising the end bars 184 positioned transversely of the stock path and suitably secured to the frame of the machine, and a plurality of spaced guide rods or wires 185 extending between said end bars. The guide grids are positioned and adapted to guide and contain the stock in its passage through the feed rolls of stand 40 substantially to the cutter. The feed rolls of stand 40 are provided with a plurality of annular grooves 186, of suitable width and depth and properly spaced to accommodate the guide wires 185 of the guide grids. Upon the severing of a bag length therefrom by the cutter, the outer end of the stock grip is prevented by means of the guide grids from wrapping around the feed rolls of stand 40, or becoming otherwise displaced from the stock path under the influence of static electrical charges thereon.

Figures 15, 16, 17, 18:
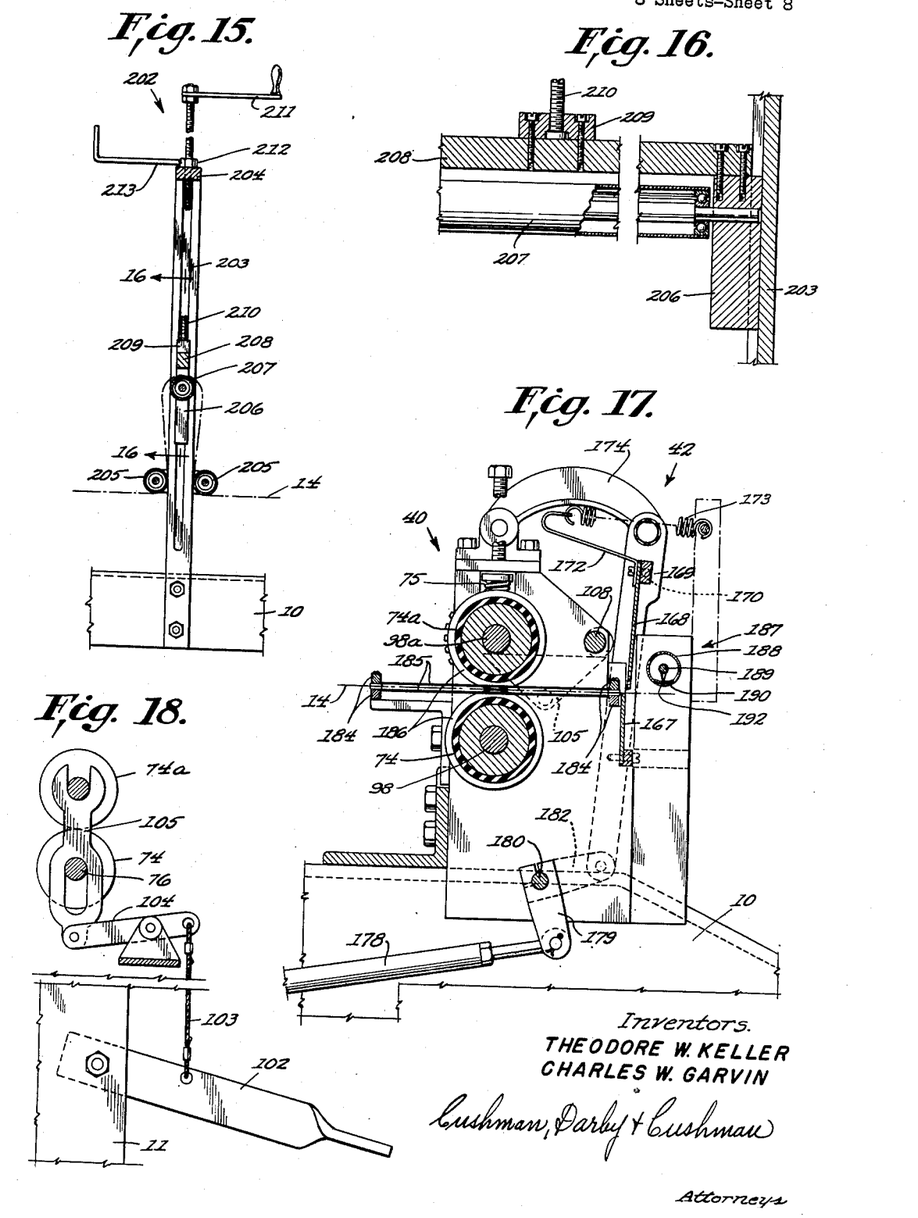
Figure 15 is an enlarged sectional elevation of the stock length adjustment mechanism, taken on the line 15—15 of Figure 2.
Figure 16 is a section taken on the line 16—16 of Figure 15.
Figure 17 is an enlarged sectional elevation of the stock guiding and cutting mechanism, taken on the line 17—17 of Figure 2.
Figure 18 is an enlarged detail view of the roll separating means for the first feed roll pair, taken on the line 18—18 of Figure 2.

To facilitate handling and stacking of the finished bags, a static bar indicated generally as 187 is positioned adjacent the stock path immediately beyond the cutter mechanism. The static bar 187, best shown in Figure 17, is a conventional element comprising the generally cylindrical outer case 188 and the central rod 189 concentrically enclosed thereby and suitably insulated therefrom. The case 188 comprises a plurality of openings 190, and the central rod 189 a plurality of pointed projections 192 extending outwardly through said openings. As will be understood, the outer case 188 is customarily grounded, and the central rod 189 subjected intermittently to current of extremely high voltage, in the neighbourhood of 50,000 volts. The static bar functions to periodically discharge electrons from the pointed projections 192, they functioning as ionizing foci in a type of corona discharge. The effect of the discharge is the electron bombardment of the adjacent surface of the stock, which serves to effectively disrupt or neutralize the static charges on the stock. The high tension current for the operation of the static bar may be supplied from the source of power utilized to drive the motor 44, through transformer unit 193, conveniently mounted on the side of the machine frame.

The finished bags as severed by the cutter are received by receiving tray 43, and, as issued, are stacked against the stop 195 adjustably fixed to one side of the tray, as by the wing nut 196. To receive bags of greater length than can be accommodated by the tray 43, the tray extension 197 is provided, and at the end thereof the stop 198. The tray extension and associated stop are slidably retained in the guides 199 extending below the tray 43, and may be adjusted relative thereto and locked at any desired position by means of the wing nut 200. Obviously, to employ the tray extension and the stop 198, it is necessary to remove the stop member 196 from the tray. The tray assembly is pivotally secured to the frame at a point adjacent the cutter mechanism, and is angularly adjustable relative thereto by means of the extension rod 201 extending from the outer end of the tray to a brace member of the frame, as shown in Figure 1. It will be apparent that the receiving tray arrangement may be replaced by a suitable conveyor, if desired, to convey the finished bags to a filling mechanism, or the bag making machine may be directly connected to suitable bag filling means.

As previously indicated, the periodic advance of the stock corresponds in extent to the desired bag length. The stock being tubular, each heat seal effected by the heat sealer is intended to serve as the bottom closure of an individual bag. The stock length between the heat sealer and the cutter is so adjusted that the stock is severed immediately adjacent the points of heat seal, so that the action of the cutter is to separate the closed bottom end of one bag from the open top end of the next. It is obvious, therefore, that proper registration of the cutter and the heat sealer relative to the stock must be maintained. The stock length between the heat sealer and the cutter must at all times be substantially equal to a whole number of bag lengths, and this extended length is necessarily variable to adapt the machine for fabricating bags of different lengths. To effect this adjustability and maintain registration the roll spacer set, indicated generally as 202, is provided intermediate the heat sealer and the second feed roll pair. The roll spacer set comprises a pair of vertical guide members 203 extending upwardly from the machine frame, and joined at their upper ends by cross member 204. On either side of the vertical guides and rotatably supported thereby is a stationary roller 205. As best shown in Figures 15 and 16, the vertical guides 203 slidably retain bushings 206, between which the movable roller 207 is suitably journalled. The bushings 206 are joined by the cross piece 208, suitably fixed, as by block 209, to the adjusting screw 210. The adjusting screw 210 is threaded through the cross member 204 and extends upwardly to an operating handle 211, suitably affixed to the end thereof. The lock nut 212 is desirably provided on the adjusting screw 210 above the cross member 204, and may conveniently comprise the operating arm 213 extending therefrom. It will be readily understood that upon loosening the lock nut 212 and rotating the adjusting screw 210 by means of its operating handle 211, the position of the cross piece 208 and the movable roller 207 associated therewith may be vertically adjusted over a considerable distance, and then locked in the desired position. The stock is arranged to pass under the first roller 205, thence over the movable roller 207, and then under the other fixed roller 205. By suitably adjusting the position of the movable roller 207 relative to the fixed rollers, then, the stock length between the heat sealer and the cutter may be varied as desired.

Figure 21:
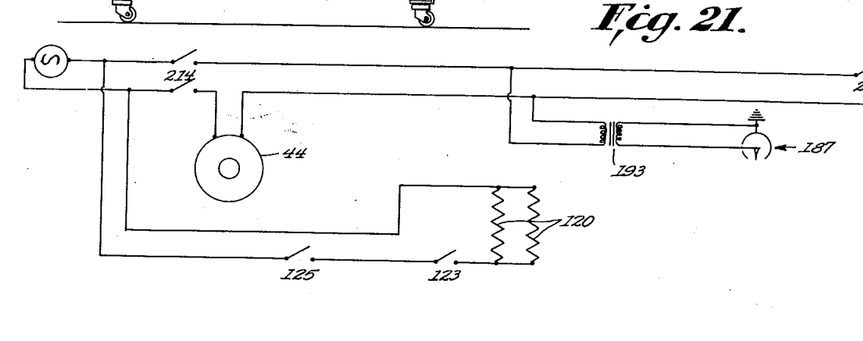
Figure 21 is a circuit diagram of the electrical system of the embodiment illustrated.

The electrical system of the machine is relatively simple, and is diagrammatically illustrated in Figure 21. As shown, the entire machine is powered by a single source of power, 115 volts A. C. being satisfactory, and a single circuit employed to power the motor 44 and the transformer unit 193 of the static bar 187. This circuit is controlled by main switch 214, conveniently mounted on the side of the frame, and an auxiliary switch 215 is provided at the delivery end of the machine, permitting the operator to stop and start the motor 44 from that position. A second circuit powers the heating elements 120, controlled by the switch 125, and the thermostatic control element 123 in circuit therewith.

Operation of the machine will now be described in detail. A stock roll of suitable width, as determined by the bag width desired, and wall thickness is mounted on one of the spindles 12, and roughly aligned thereon by means of positioning cones 13. The spindle is then mounted on the frame and finally aligned by means of the screws 15. The end of the stock is then passed under the guide rods 21, over the guide roll 22, about the guide roll 26 and over the guide rolls 27 to the table section 28, in the manner previously described. The stock end is next threaded under the control bars 37, through the first feed roll pair, through the wipers and sealing members of the heat sealer, under the first stationary roller 205 of the roll spacer set, over the movable roller 207, under the second stationary roller 205 and thence through the guide grids and the second feed roller pair to the cutter. Threading of the stock through the first feed roll pair is facilitated by the treadle 102, by means of which the upper feed roll is lifted, and similarly through the second feed roll pair by operation of handle 109.

By means of the slot 59 of screw 58, whereby the slide 57 is properly positioned, and the selection of the desired drive ratio of the transmission 77, as controlled by the handle 92, the machine is adjusted for the desired bag length. By means of switch 125, the heating elements 120 of the heat sealer are energized and allowed to come up to temperature, and the control dial 126 set to controllably determine and maintain the temperature of the sealing members through the instrumentality of the thermostatic control element 123. By means of operating handle 211 of the roll spacer set, the extended stock length is adjusted to a multiple of the desired bag length.

The motor 44 may now be started by means of main switch 214, whereupon the stock is intermittently advanced by the feed roll pairs. The stock advances one bag length and stops, whereupon the heat sealer functions to effect a transverse heat seal across the stock strip. At the same time, the cutter functions to sever a bag length from the stock strip. The sealing elements and cutter blades then separate, whereupon the feed roll pairs advance the stock another bag length, beginning a new cycle of operation. The sealed and severed bags are delivered directly by the cutter into the receiving tray, in stacked arrangement, or, as previously indicated, may be delivered to a conveyor, or directly to filling mechanism or to shipping cartons.

The desired registry of the heat sealing and cutting operations, whereby the stock is severed immediately adjacent the heat seals, may be maintained by adjustment of the roll spacer set while the machine is operating. Similarly, necessary adjustments of the bag length necessitated by variable stock elongation or other conditions may be effected by adjustment of slide 57 by means of the handle 73, also without interrupting the operation of the machine. The spacing between the sealing members at their point of nearest approach may be suitably selected by means of the stop rods 138, in accordance with the original thickness of the stock, the type of stock material being fabricated, and other variables, and if the thickness of the stock is not uniform across its width, differential adjustment may be effected thereby.

The control bars 37 facilitate the stock feed by flattening and guiding the stock, and also serve to prevent fold-over and other undesirable behavior of poor stock. In the event the interior surfaces of the stock are found to be slightly blocked, making opening of the finished bags difficult, a bubble of air or other fluid may be inserted into the interior of the stock and retained between the control bars. This is simply performed by puncturing one wall of the stock intermediate said control bars, inserting the desired fluid, and then sealing the puncture, as with a piece of tape. In this manner the stock is opened interiorly in passage through the machine, and the finished bags are assured to be freely opening.

The functioning of the heat sealer, as previously indicated, is highly critical. Polyethylene stock exhibits a sharply defined melting point range, usually within the range of from 218° to 220° F. In fabricating polyethylene material, the heat sealer has been found to function best if the temperature of the sealing members thereof is maintained at a temperature slightly below the melting point range of the stock, temperatures within the range of from 210° to 215° F. having been found to be especially suitable. The melting point range of polyvinylidene chloride material is similarly sharply defined, in the neighbourhood of 270° F., and a sealing member temperature slightly below the melting point has been found to be similarly effective in satisfactorily heat sealing this material. In employing sealing temperatures below the melting point range of the stock, momentary engagement of the stock by the sealing members has been found insufficient to effect a satisfactory seal, even with high pressure. For this reason, the cam 110 is so designed and the speed of the machine accordingly coordinated as to effect sealing contact of the stock by the sealing members for a time period of from 0.05 to 1.0 second, preferably between 0.1 and 0.5 second. The sealing time period and the sealing temperatures above specified, combined with the uniformity of pressure application throughout the heat sealing operation, which is an inherent characteristic of the resiliently mounted sealing member, together have been found to effect excellent fluid-tight seals, of uniformly good appearance. That is, the heat sealed stripe is smooth, flat and uniform, and the adjacent areas of the stock not deformed by wrinkles, undulations or the like.

In order to preserve the uniformly excellent appearance of the seals in the finished bags, it has been found desirable to maintain the stock under tension until the seals have cooled. This effect is inherent in the embodiment described, wherein the stock traverses a considerable distance, corresponding to several bag lengths and cycles of operation, between the heat sealer and the second feed roll stand. As previously stated, the second feed roll stand is operated at greater periphereal speed than is the first feed roll stand, thereby effecting a slightly greater stock advance per cycle of operation, whereby stretch of the material and elongation thereof incident to the heat sealing operation are absorbed, and the desired tension maintained in the stock strip between the first and second feed roll stands. The operator, of course, may adjust the speed differential between the feed roll stands, as may be necessary to maintain proper tension, by means of the variable speed pulley 99. In fabricating polyvinylidene chloride stock, tensioning of the material during cooling of the heat seals is especially desirable, since under the influence of heat the molecular orientation of this material tends to become disturbed, causing curling and wrinkling of the extruded stock material.

When satisfactory adjustments have been made and perfect bags of the desired length are being uniformly produced, the operation of the machine may be speeded up by movement of the motor 44, to increase the effective pitch diameter of the variable speed pulley thereof, or in the case of a variable speed motor, merely by suitable control. Operated in this manner, the machine is capable of producing continuously from 2,000 to 4,000 bags per hour, the production rate varying more or less inversely with the length of the bags being produced.

It will thus be seen, that there has been provided by this invention a machine by which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

This application is a division of application Serial No. 82,934, filed March 23, 1949.

We claim:

1. Apparatus for making bags from tubular thermoplastic stock comprising a first pair of feed rolls, a second pair of feed rolls, means for intermittently driving said feed roll pairs in unison, intermittently operated sealing means positioned intermediate said feed roll pairs, intermittently operated cutting means positioned beyond said second feed roll pair, means coordinating the operation of said feed roll pairs, said sealing means and said cutting means whereby said sealing means and said cutting means operate between intervals of feed roll operation, and means for adjusting the stock length between said sealing means and said cutting means.

2. Apparatus for making bags from tubular thermoplastic stock comprising: a first pair of feed rolls; a second pair of feed rolls; means for intermittently driving said feed roll pairs in unison; intermittently operated heat sealing means positioned intermediate said feed roll pairs, said heat sealing means including a pair of spaced parallel guideways, a fixed sealing member rigidly mounted with respect to said guideways, a reciprocating carriage slidably retained by said guideways in opposed relationship to said fixed sealing member, a movable sealing member resiliently supported by said carriage in spaced adjacency to said fixed sealing member, and means for controllably heating said sealing members; intermittently operated cutting means positioned beyond said second feed roll pair; and means coordinating the operation of said feed roll pairs, said heat sealing means and said cutting means whereby said heat sealing means and said cutting means operate between intervals of feed roll operation.

3. Apparatus for making bags from tubular thermoplastic stock comprising a first pair of feed rolls, a second pair of feed rolls, means for intermittently driving said feed roll pairs in unison at different peripheral speeds, means for continuously varying the peripheral speed differential between said feed roll pairs, intermittently operated heat sealing means positioned intermediate said feed roll pairs, intermittently operated cutting means positioned beyond said second feed roll pair, and means coordinating the operation of said feed roll pairs, said heat sealing means and said cutting means whereby said heat sealing means and said cutting means operate between intervals of feed roll operation.

4. Apparatus according to claim 2, wherein said heat sealing means includes adjustable stop means associated with each of the guideways to controllably and differentially limit the approach of the movable sealing member to the fixed sealing member.

5. Apparatus for making bags from tubular thermoplastic stock comprising a first pair of feed rolls, a second pair of feed rolls, means for intermittently driving said feed roll pairs in unison, intermittently operated heat sealing means positioned intermediate said feed roll pairs, wiper means adapted to engage said heat sealing means in inoperative position, intermittently operated cutting means positioned beyond said second feed roll pair, and coordinating means effective to operate said heat sealing means and said cutting means when said feed roll pairs are at rest and to operate said wiper means when said heat sealing means is inoperative.

6. Apparatus for making bags from tubular thermoplastic stock comprising a first pair of feed rolls for advancing said stock, a second pair of feed rolls for advancing said stock, means for intermittently driving said feed roll pairs in unison at different peripheral speeds, the peripheral speed of said second pair being the greater, intermittently operated sealing bars positioned intermediate said feed roll pairs adjacent the path of said stock and transverse thereto, intermittently operated cutting means positioned beyond said second feed roll pair adjacent the path of said stock and transverse thereto, coordinating means effective to operate said sealing means and said cutting means when said feed roll pairs are at rest, three guide rollers positioned intermediate said sealing bars and said cutting means along the path of said stock, and means for adjusting the position of the center roller relative to the other two of said rollers, whereby the operation of said sealing bars and said cutting means may be maintained in predetermined registry on said stock.

7. Apparatus for making bags from tubular thermoplastic stock comprising a first pair of feed rolls for advancing said stock, a second pair of feed rolls for advancing said stock, means for intermittently driving said feed roll pairs in unison at different peripheral speeds, means for continuously varying the peripheral speed differential between said roll pairs, intermittently operated heat sealing bars positioned intermediate said feed roll pairs adjacent the path of said stock and transverse thereto, reciprocating wiper means adapted to engage said sealing bars in inoperative position, intermittently operated cutting means positioned beyond said second feed roll pair adjacent the path of said stock and transverse thereto, and coordinating means effective to operate said heat sealing bars and said cutting means when said feed roll pairs are at rest and to operate said wiper means when said heat sealing bars are inoperative.

8. Heat and pressure sealing mechanism including a fixed sealing member, a reciprocating carriage mounted in opposed relationship to said fixed sealing member, a movable sealing member resiliently supported by said carriage in spaced adjacency to said fixed sealing member, means for heating said sealing members, and means for reciprocating said carriage whereby said movable sealing member is periodically brought into operative sealing relationship with said fixed sealing member.

9. Heat and pressure sealing mechanism including a pair of spaced, parallel guideways, a fixed sealing member rigidly mounted with respect to said guideways, a reciprocating carriage slidably retained by said guideways in opposed relationship to said fixed sealing member, a movable sealing member resiliently supported by said carriage in spaced adjacency to said fixed sealing member, means for controllably heating said sealing members, and means for reciprocating said carriage whereby said movable sealing member is periodically brought into operative sealing relationship with said fixed sealing member.

10. Mechanism according to claim 9, wherein said sealing members are of great mass relative to the effective sealing area thereof.

11. Heat and pressure sealing mechanism including a pair of spaced, parallel guideways, a fixed sealing member rigidly mounted with respect to said guideways, a reciprocating carriage slidably retained by said guideways in opposed relationship to said fixed sealing member, spring means extending from said carriage, a movable sealing member retained by said guideways and resiliently supported by said spring means in spaced adjacency to said fixed sealing member, means for controllably heating said sealing members, means for reciprocating said carriage whereby said movable sealing member is periodically brought into operative sealing relationship with said fixed sealing member, and adjustable stop means to limit the approach of said movable sealing member to said fixed sealing member.

12. Heat and pressure sealing mechanism including a pair of spaced, parallel guideways, a fixed sealing member rigidly mounted with respect to said guideways, a reciprocating carriage slidably retained by said guideways in opposed relationship to said fixed sealing member, a plurality of spaced spring means extending from said carriage, a movable sealing member retained by said guideways and resiliently supported by said spring means in spaced adjacency to said fixed sealing member, means for controllably heating said sealing members, means for reciprocating said carriage whereby said movable sealing member is periodically brought into operative sealing relationship with said fixed sealing member, and adjustable stop means associated with each of said guideways to controllably and differentially limit the approach of said movable sealing member to said fixed sealing member.

13. Heat and pressure sealing mechanism including a pair of spaced, parallel guideways, a fixed sealing member rigidly mounted with respect to said guideways, a reciprocating carriage slidably retained by said guideways in opposed relationship to said fixed sealing member, a movable sealing member retained by said guideways and resiliently supported by said carriage in spaced adjacency to said fixed sealing member, means for reciprocating said carriage whereby said movable sealing member is periodically brought into operative sealing relationship with said fixed sealing member, adjustable stop means to limit the approach of said movable sealing member to said fixed sealing member, wiper blades mounted for lateral reciprocation between said guideways relative to said sealing members, means for reciprocating said wiper blades, and means coordinating the reciprocation of said wiper blades and said movable sealing member to effect operation of said wiper blades when said sealing members are in spaced, inoperative position.

14. Apparatus for making bags from tubular thermoplastic stock comprising: a first pair of feed rolls, a second pair of feed rolls, means for intermittently driving said feed roll pairs in unison, intermittently operated sealing means positioned intermediate said feed roll pairs, intermittently operated cutting means positioned beyond said second feed roll pair, means coordinating the operation of said feed roll pairs, said sealing means and said cutting means to cause operation of said sealing means and said cutting means between intervals of feed roll operation, and spaced guide grids positioned and adapted to guide the stock through said second pair of feed rolls to said cutting means, said second pair of said rolls being circumferentially grooved to accommodate said guide grids.

15. In apparatus for making bags from tubular thermoplastic stock having transverse heat-sealing means, cutting means spaced therebeyond, means for advancing the stock from the sealing means to the cutting means and means for intermittently operating the stock-advancing means and for operating the sealing means and the cutting means between intervals of stock advance, the combination of means disposed between the sealing means and the cutting means for adjusting the stock length therebetween.

16. The structure defined in claim 15 in which the stock length adjusting means includes adjustably mounted roll means for deflecting the stock from a direct path of travel between the sealing means and the cutting means.

17. The structure defined in claim 15 in which the sealing means and the cutting means are mounted in fixed relation to each other.

18. The structure defined in claim 15 including means for operating the adjusting means during operation of the apparatus.

19. The structure defined in claim 15 in which the adjusting means includes a roll disposed between the sealing means and the cutting means, transversely of the path of travel of the stock, and in engagement with the latter; and means mounting said roll for substantially translational adjusting movements to and from the plane of the stock.

20. The structure defined in claim 19 including a manually-operable crank for operating the roll mounting means.

21. In apparatus for making bags from tubular thermoplastic stock having a pair of feed rolls, cutting means disposed substantially immediately therebeyond, and means for intermittently operating the feed roll pair and for operating the cutting means between intervals of feed roll operation, the combination of spaced guide grids positioned to guide the stock through and between the rolls to the cutting means without wrap-up on the rolls; and means defining circumferential grooves in the rolls for accommodating said guide grids.

22. Heat and pressure sealing mechanism including a rigid abutment, a reciprocating carriage mounted in opposed relation to said abutment, a movable sealing member resiliently supported by said carriage in spaced adjacency to said abutment, means for heating said sealing member, and means for reciprocating said carriage whereby said movable sealing member is periodically brought into operative sealing relationship with said abutment.

23. The structure defined in claim 22 including adjustable stop means to limit the approach of the sealing member to the abutment.

THEODORE W. KELLER.
CHARLES W. GARVIN.

References Cited in the file of this patent

UNITED STATES PATENTS

| Number | Name | Date |
|---|---|---|
| 2,155,614 | Petskeyes et al. | Apr. 25, 1939 |
| 2,326,931 | Dalton | Aug. 17, 1943 |
| 2,376,253 | Humphrey | May 15, 1945 |
| 2,449,972 | Beach | Sept. 28, 1948 |
| 2,467,879 | Billeb | Apr. 19, 1949 |